(12) United States Patent
Mountcastle

(10) Patent No.: US 10,451,709 B1
(45) Date of Patent: Oct. 22, 2019

(54) PASSIVE TRACKING OF OBJECTS USING BISTATIC DUAL-POLARIZATION RECEIVERS

(71) Applicant: Reservoir Labs, Inc., New York, NY (US)

(72) Inventor: Paul D. Mountcastle, Moorestown, NJ (US)

(73) Assignee: Reservoir Labs, Inc., New York, NY (US)

( * ) Notice: Subject to any disclaimer, the term of this patent is extended or adjusted under 35 U.S.C. 154(b) by 219 days.

(21) Appl. No.: 15/210,138

(22) Filed: Jul. 14, 2016

Related U.S. Application Data

(60) Provisional application No. 62/192,379, filed on Jul. 14, 2015.

(51) Int. Cl.
  *G01S 5/02* (2010.01)
  *G01S 5/06* (2006.01)
  *G01S 7/02* (2006.01)

(52) U.S. Cl.
  CPC ............ *G01S 5/0294* (2013.01); *G01S 5/06* (2013.01); *G01S 7/024* (2013.01)

(58) Field of Classification Search
  CPC .......... G01S 5/0294; G01S 5/06; G01S 7/024; G01S 3/146; H01Q 21/245; H01Q 3/26; H04B 7/10; H04B 7/002
  USPC .......................................................... 342/362
  See application file for complete search history.

(56) References Cited

U.S. PATENT DOCUMENTS

| | | | |
|---|---|---|---|
| 6,380,896 B1 * | 4/2002 | Berger ................. | H01Q 9/0435 343/700 MS |
| 8,391,334 B1 * | 3/2013 | Mower .................... | H04B 7/10 375/142 |
| 2015/0042503 A1 * | 2/2015 | Morelande ............ | G01S 13/347 342/27 |

OTHER PUBLICATIONS

A. Farina, Ch. 9: Electronic Counter-Countermeasures, in Radar Handbook, 2nd ed. by Merrill I. Skolnik (ed.) (2008) (18 pages).

* cited by examiner

*Primary Examiner* — Harry K Liu
(74) *Attorney, Agent, or Firm* — Goodwin Procter LLP

(57) ABSTRACT

A system for detecting and/or tracking a moving object uses signals received from the object at two or more receivers, each of which is dual polarized. At each receiver, the component of the received signal associated with the polarization thereof is separated from the non-polarization-based component, and the modulation of the polarization-based component is used for locating and/or tracking the moving object.

19 Claims, 7 Drawing Sheets

PASSIVE TRACKING OF OBJECTS USING BISTATIC DUAL-POLARIZATION RECEIVERS

CROSS REFERENCE TO RELATED APPLICATIONS

This application claims benefit of priority to U.S. Provisional Patent Application Ser. No. 62/192,379 entitled "Passive Tracking of an Airborne Jammer Using Bistatic Dual Polarization Receivers," filed on Jul. 14, 2015, the entire contents of which are incorporated herein by reference.

FIELD OF THE INVENTION

This disclosure generally relates to systems and methods for radar signal processing and, in particular, to detection and ranging using polarized radar signals.

BACKGROUND

It is beneficial to locate and track objects moving on ground and in air and/or space, and radar systems are commonly used for such tracking. For example, radar systems can be used to track commercial and military aircrafts, un-manned airborne vehicles such as drones, ballistic and cruise projectiles, speeding cars, etc. In many radar-based tracking systems, an electromagnetic signal or a pulse is transmitted in the direction of the suspected location of the moving object to be located and/or tracked. In some cases, e.g., when there is no suspected location, a spatial region may be swept with transmitted signals. Should a transmitted signal hit a moving object, that object would typically reflect that signal, and the reflected signal(s) can be detected by one or more receivers. The frequency of the reflected signal may be different from that of the transmitted signal due to the Doppler effect, where the change in the frequency is related to the speed of the moving object. The received signal(s) can be used to determine the location and/or speed of the moving object.

In some cases, the detection and/or tracking of an object can be defeated using a technique known as radar jamming. For example, the driver of a speeding car may use a radar jammer so that the speed of the car may not be determined by law-enforcement personnel. Jamming is often employed by an aircraft on a covert reconnaissance or attack mission or by a drone, so that these moving objects may not be located and/or tracked by an adversary. A digital radio frequency (RF) memory (DRFM) jammer is a commonly used jammer that includes a receiver, a DRFM, a transmitter, and a retro-directive antenna.

When a DRFM jammer is deployed on a moving object such as an aircraft, it can receive pulses from a radar and return them with modified apparent ranges and Doppler shifts, in order to inundate the radar with a large number of apparent, fake targets together with the actual reflection signal. This can make the detection and tracking of the aircraft more difficult. FIG. 1, obtained from http://www-.mykonsult.com/ shows a simulated Plan Position Indicator (PPI) display for a relatively unsophisticated range-Doppler radar that has been inundated with several replica signals that are generated electronically by a DRFM jammer, along with the genuine reflection signal. While the genuine reflection signal appears as a target 102 in the PPI display, several other targets 104, each one corresponding to a replicated signal, also appear in the PPI display. Usually, the receiver and/or the radar operator cannot distinguish the actual target 102 from the fake targets 104. In some cases, because the strength of the replicated signals is stronger than that of the reflection signals, the genuine target may not even be recognized by the receiver and/or may not be displayed in the PPI display. Such a jammer generally represents an asymmetric threat because it is inexpensive and readily available even to an unsophisticated adversary.

SUMMARY

In various embodiments, techniques are described for countering this threat and, in fact reversing the asymmetric advantage, by passively tracking a moving object that may be equipped with a radar jammer. This is achieved in part by receiving a signal transmitted by a moving object to be detected and/or tracked, and by separating a polarization-based component of the received signal from a non-polarization-based component thereof. By observing that the polarization is modulated at least in part by the motion of the object itself, and that such motion generally cannot be manipulated to avoid or mitigate modulation of the polarization, the polarization modulation is determined and may be used to locate and/or track the object. This technique can use conventional radar receivers and the additional hardware and/or software systems for performing various computations described herein.

Accordingly, in one aspect a method is provided for determining the location, orientation, range, and/or speed of a moving object. The method includes receiving from a first receiver antenna system a first signal transmitted by a moving object. The first receiver antenna system may include a first left polarized receiver and a first right polarized receiver. In some embodiments, the first receiver antenna system may include two polarized antennas, e.g., a first left polarized antenna and a first right polarized antenna. The method also includes receiving from a second receiver antenna system including a second left polarized receiver or antenna and a second right polarized receiver or antenna, a second signal transmitted by the moving object. The second receiver antenna system is spaced apart from the first receiver antenna system along a baseline. The first and second signals may correspond to a transmission from the moving object that propagates in part toward the first receiver antenna system and in part towards the second receiver antenna system.

The method also includes extracting from the first signal a first polarization-based component, which can be a left polarized component corresponding to the first signal or a right polarized component corresponding to the first signal. Both of these components may be extracted. In addition, the method includes extracting from the second signal a second polarization-based component, which can be a left polarized component corresponding to the second signal or a right polarized component corresponding to the second signal. Here again, both of these components may be extracted. The method further includes computing a time difference maximizing a correlation of the first and second polarization-based components, and computing a location of the moving object based on, in part, the time difference. The location may also include orientation, range, and/or speed of the moving object.

Extracting from the first signal a first polarization-based component may include determining a first amplitude and a first phase of an electric field associated with the first signal, and scaling the first signal according to the first amplitude and the first phase. Similarly, extracting from the second signal a second polarization-based component may include determining a second amplitude and a second phase of an electric field associated with the second signal, and scaling the second signal according to the second amplitude and the second phase. The first and second polarization-based components may correspond to the first and second left polarized receivers/antennas. Alternatively, the first and second polarization-based components may correspond to the first and second right polarized receivers/antennas.

In various embodiments, the first and second signals are polarized and the type of the polarization can be linear polarization, circular polarization, or elliptical polarization. The first and/or second signals may be received from a first instance of time t1 at least up to a second instance of time t2. The polarization associated with the first and/or second signals may change with time. Specifically, a polarization associated with the first and/or second signals has a polarization value at the second instance of time t2 that is different from a polarization value at the first instance of time t1. For example, assume circular polarization and that at time t1, the polarization relative to the X axis is at 45.3°. Further assume that at time t2, the polarization relative to the X axis changes to 47.5°. A part of the change of 2.2° can be attributed to the fact that the electric field is rotating. A part of this change can be attributed to the fact that the moving object (e.g., an aircraft, a missile, etc.) is tilting, rolling, etc. As such, in some embodiments the polarization value changes from the first instance of time t1 at least up to the second instance of time t2, and the change corresponds at least in part to a motion of the moving object. The moving object can be an aircraft, a drone, or a missile. The first and second signals may transmitted by a jammer aboard the moving object or by another transmitter.

In another aspect, a system is provided for determining the location, orientation, range, and/or speed of a moving object. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both. The instructions in the first memory program the processing unit to receive from a first receiver antenna system having a first left polarized receiver/antenna and a first right polarized receiver/antenna a first signal transmitted by a moving object, and to receive from a second receiver antenna system having a second left polarized receiver or antenna and a second right polarized receiver or antenna, a second signal transmitted by the moving object.

The instructions also program the processing unit to extract from the first signal a first polarization-based component, which can be a left polarized component corresponding to the first signal or a right polarized component corresponding to the first signal, and to extract from the second signal a second polarization-based component, which can be a left polarized component corresponding to the second signal or a right polarized component corresponding to the second signal. The instructions further program the processing unit to compute a time difference maximizing a correlation of the first and second polarization-based components, and to compute a location of the moving object based on, in part, the time difference. The location may also include orientation, range, and/or speed of the moving object. In various embodiments, the instructions can program the processing unit to perform one or more of the method steps described above. In some embodiments, the system includes the first and/or second receiver antenna systems, and the two systems may be located on a baseline and may be separated by a specified distance.

In another aspect, an article of manufacture is provided that includes a non-transitory storage medium having stored therein instructions which, when executed by a processing unit program the processing unit, which is in electronic communication with a memory module, to determine the location, orientation, range, and/or speed of a moving object. The instructions may program the processing unit to receive from a first receiver antenna system having a first left polarized receiver/antenna and a first right polarized receiver/antenna a first signal transmitted by a moving object, and to receive from a second receiver antenna system having a second left polarized receiver or antenna and a second right polarized receiver or antenna, a second signal transmitted by the moving object.

The instructions also program the processing unit to extract from the first signal a first polarization-based component, which can be a left polarized component corresponding to the first signal or a right polarized component corresponding to the first signal, and to extract from the second signal a second polarization-based component, which can be a left polarized component corresponding to the second signal or a right polarized component corresponding to the second signal. The instructions further program the processing unit to compute a time difference maximizing a correlation of the first and second polarization-based components, and to compute a location of the moving object based on, in part, the time difference. The location may also include orientation, range, and/or speed of the moving object. In various embodiments, the instructions can program the processing unit to perform one or more of the method steps described above.

BRIEF DESCRIPTION OF THE DRAWINGS

In the following description, various embodiments of the present invention are described with reference to the following drawings, in which.

DETAILED DESCRIPTION

Figure 1:
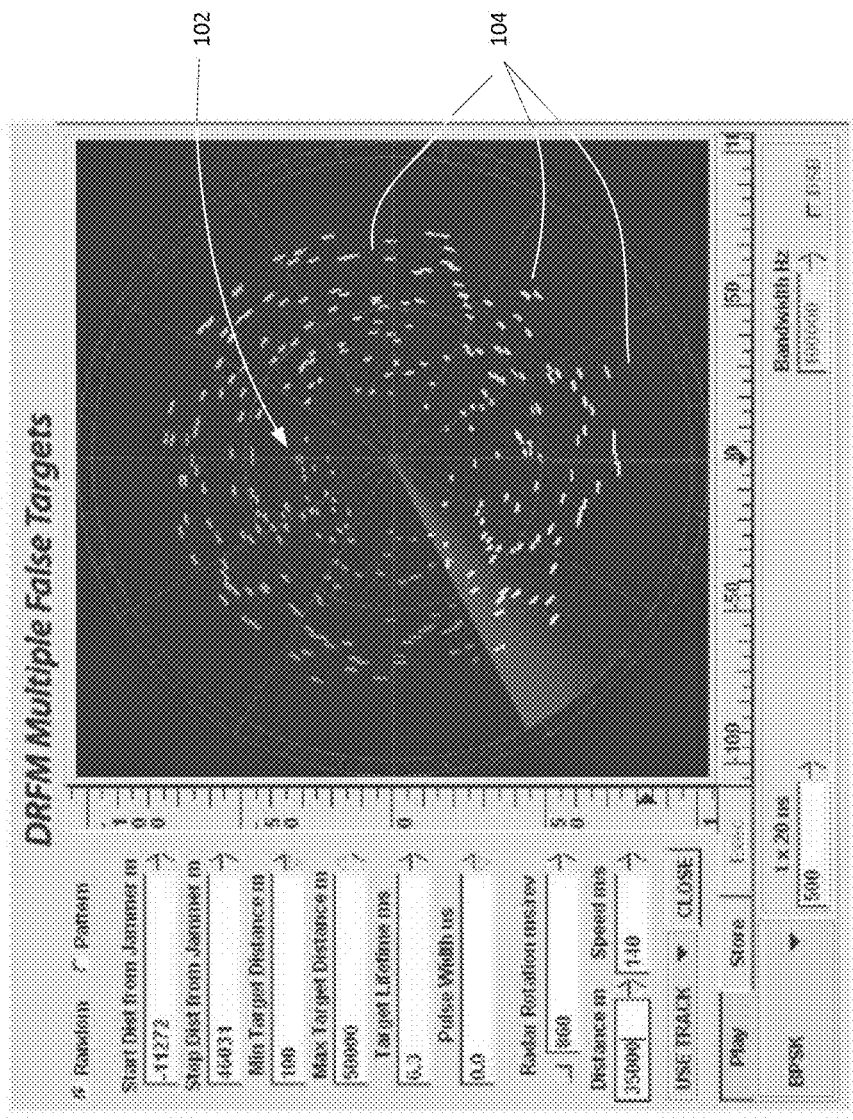
FIG. 1 depicts an example PPI display for a radar inundated with electronic replica targets generated by a DRFM jammer.
Figures 2A, 2B, 2C:
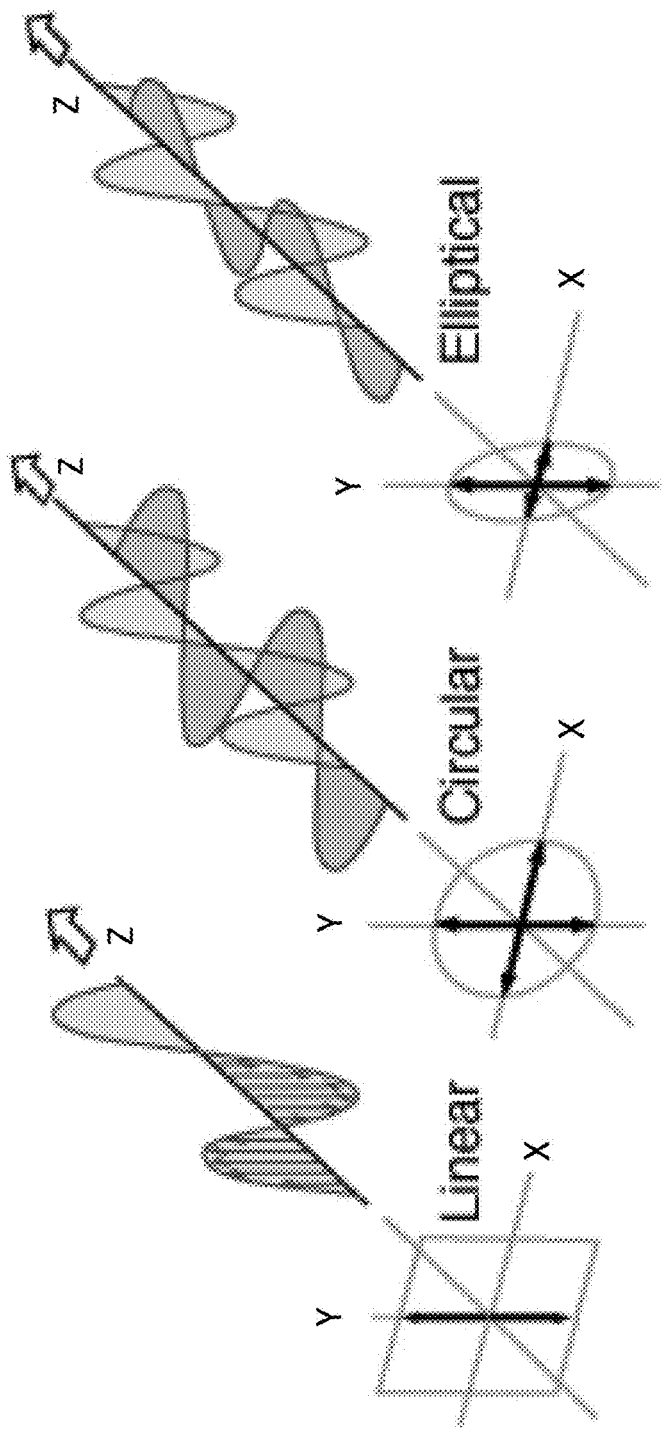
FIGS. 2A-2C show the respective electric fields of linearly, circularly, and elliptically polarized electromagnetic waves.

A radar signal at a given frequency is coherent and has an amplitude, a phase, and a polarization. With reference to FIGS. 2A-2C, obtained in part from http://hyperphysics.phyastr.gsu.edu/hbase/phyopt/polclas.html, the polarization may be linear, circular, or elliptical. If the space is represented using a co-ordinate frame of mutually perpendicular X, Y, and Z axes, and if the signal transmitted by a radar jammer or a transmitter is assumed to propagate in the Z direction, the electric field $\vec{E}$ of the signal may oscillate in the X-Z plane and the magnetic field $\vec{B}$ may oscillate in the Y-Z plane. Such a signal is conventionally called a plane-polarized or a horizontally polarized signal. In an unpolarized electromagnetic signal, the electric field may oscillate not only in the X-Z plane but in any plane.

Figure 3A:
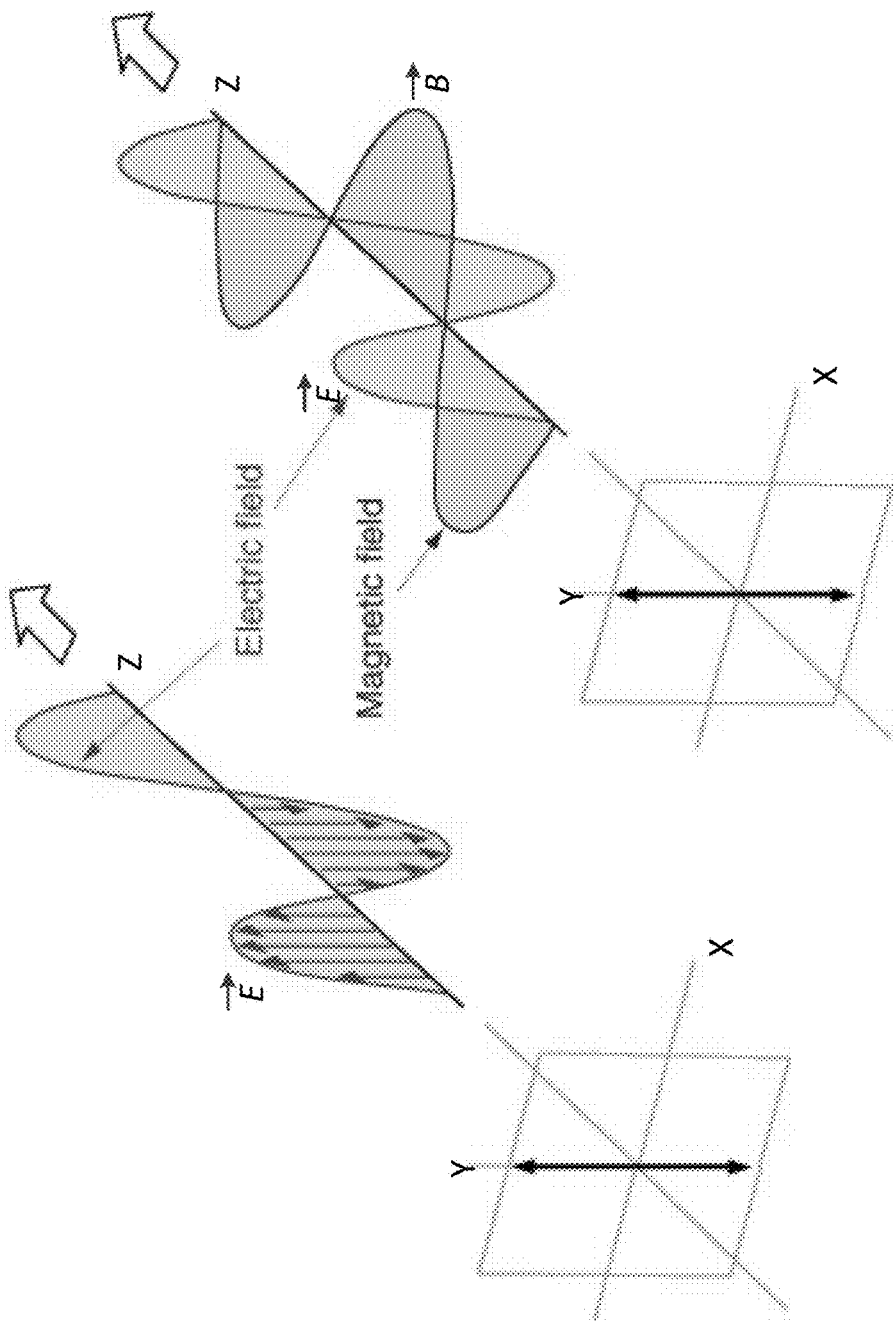
FIGS. 3A-3C respectively show linearly (vertically), circularly, and elliptically polarized, electromagnetic waves.
Figure 3B:
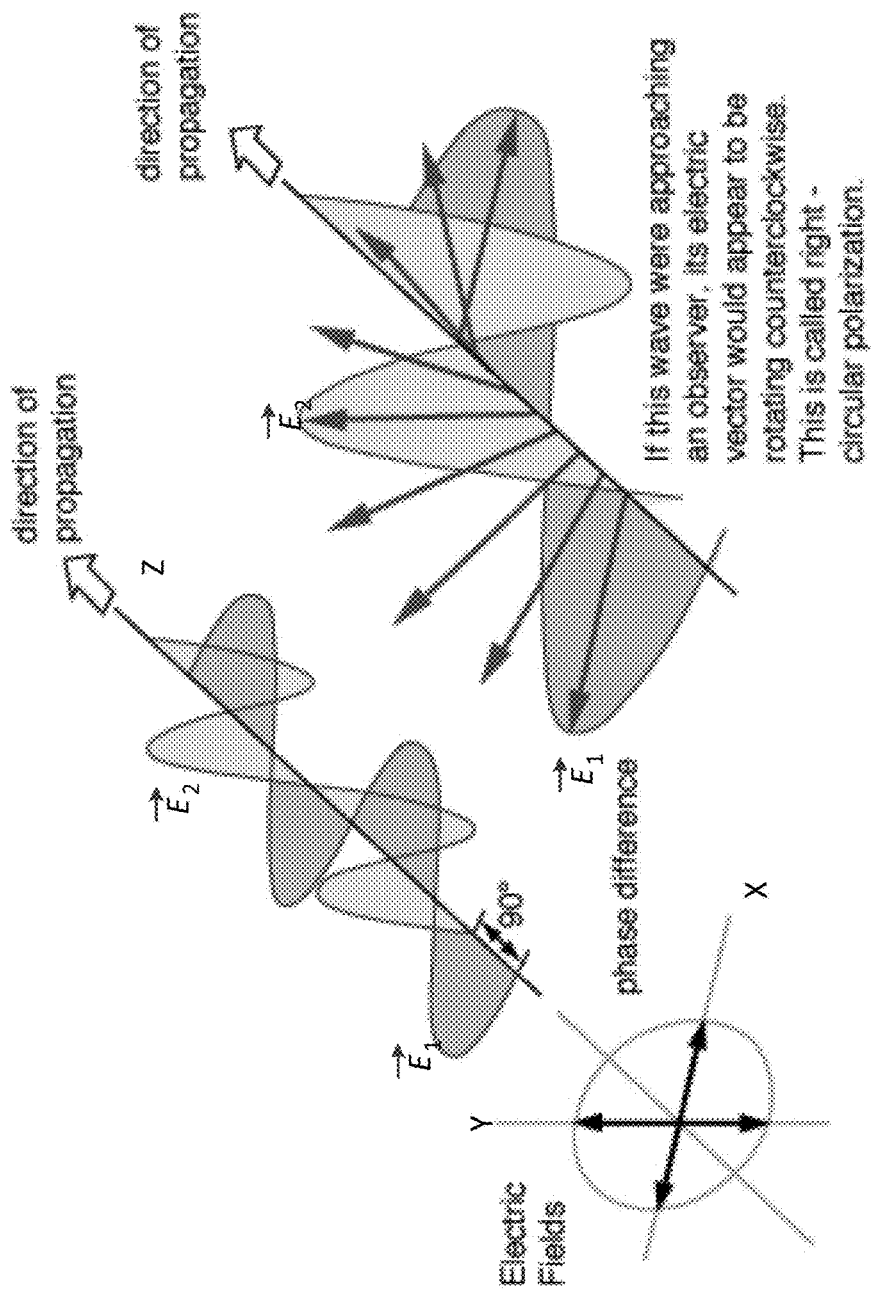
Figure 3C:
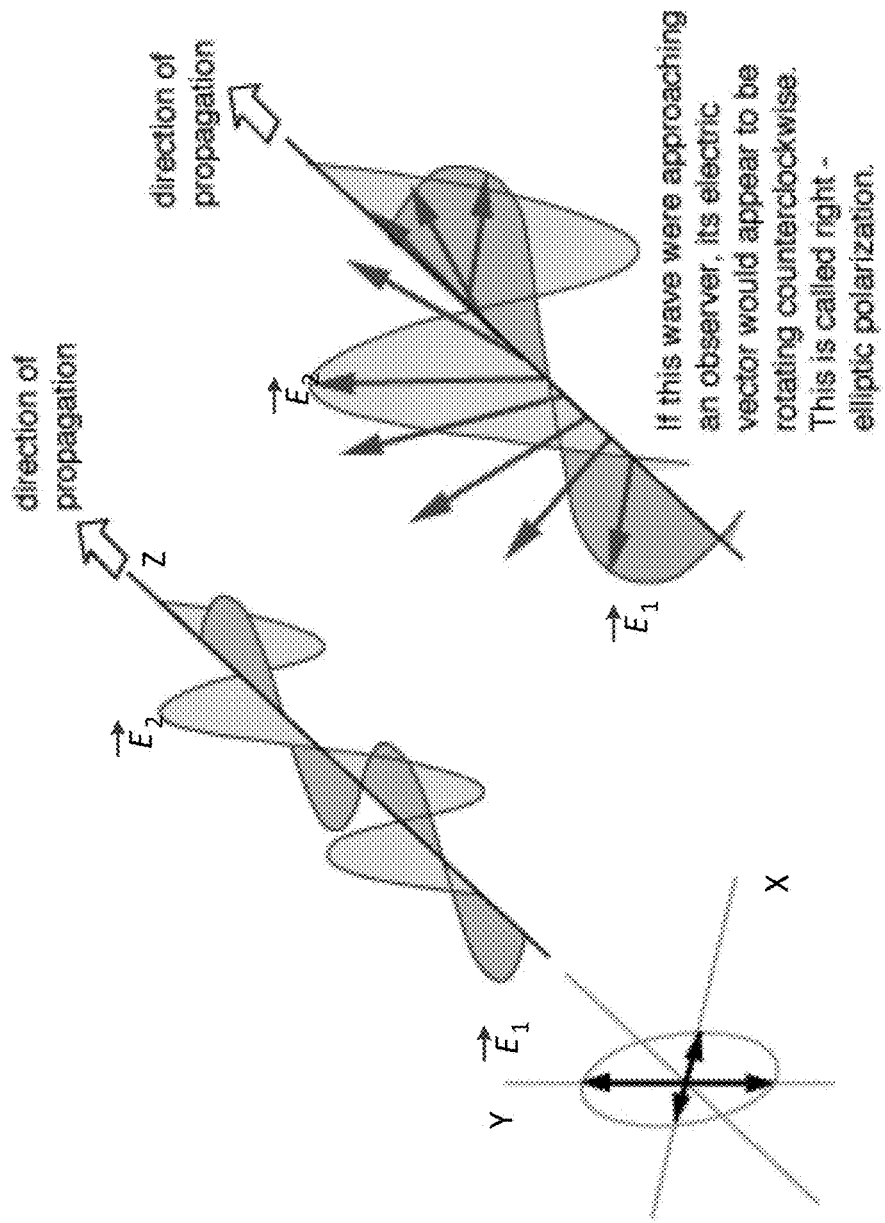

The plane polarized signal described above is also called a linearly polarized signal. FIG. 3A depicts a vertically polarized signal in which the electric field lies in the Y-Z plane and the magnetic field lies in the X-Z plane. In a circularly polarized signal, the electric field oscillates in two planes that are perpendicular to each other, as shown in FIG. 3B. The magnitude of the electric field in each plane is the same. To an observer towards whom the signal is approaching, the electric field would appear to be rotating in a counter-clockwise direction, and such polarization is typically called right-circular polarization. In FIG. 3A, if the polarization in the X-Z field were shifted by 180°, to the same observer the electric field would appear to be rotating in a clockwise direction, and such polarization is typically called left-circular polarization. As shown in FIG. 3C, in an elliptically polarized signal, the electric field may oscillate in two planes that are perpendicular to each other, but the magnitudes of the electric fields in the two planes is different. In elliptically polarized electromagnetic signals, the two planes in which the electric field oscillates may not be perpendicular, i.e., the angle therebetween (also called the relative phase) can be other than 90°. FIGS. 3A-3C are obtained in part from http://hyperphysics.phyastr.gsu.edu/hbase/phyopt/polclas.html.

A monochromatic (i.e., having a single frequency or frequencies within a narrow band) radar signal can be described as a complex linear superposition of plane waves polarized in two perpendicular orientations or planes. These planes can be X-Z and Y-Z planes if the signal is propagating along the Z axis, or X-Y and Z-Y planes, if the signal is propagating along the Y axis, or Y-X and Z-X planes, if the signal is propagating along the X axis. For convenience, we refer to the two polarization orientations/planes as right and left polarizations. As such a signal received from a moving object can be expressed as a column vector with the amplitude for left or right polarization on top and the amplitude for right or left polarization on the bottom. Such a signal can be an actual reflection of a signal transmitted towards the moving object, a replica generated and transmitted by a jammer at the moving object, or a signal transmitted by the moving object for detecting/tracking other objects. The amplitude of the electric field vector of the received signal at any point in space then has the form:

$$E(t) = \mathrm{Re}(A e^{j(\omega t+\phi)} \begin{bmatrix} l(t) \\ r(t) \end{bmatrix}) \quad (1)$$

where the complex quantities l(t) and l(t), also denoted l and r, respectively, for the sake of convenience, must satisfy the constraint l*l+r*r=1. A is the amplitude of the electric field and $\phi$ is the phase of the electric field.

The harmonic factor $e^{j\omega t}$ associated with the signal is always present, so it can be omitted from the expression for the sake of simplicity. Thus, the polarized signal received from the moving object can be described as a complex column vector that can express the slowly-varying polarization envelope of the signal as:

$$\vec{p} = \begin{bmatrix} L(t) \\ R(t) \end{bmatrix} = A e^{i\phi} \begin{bmatrix} e^{i\tau(t)}\cos\psi(t) \\ e^{-i\tau(t)}\sin\psi(t) \end{bmatrix} \quad (2)$$

In Equation 2, the quantities τ(t) and ψ(t) are polar and azimuth angles, respectively, associated with the Poincaré Sphere. These quantities typically vary in time due to the motion of the object, such as yaw, pitch, and/or roll. The unitary constraint on the left- and right-polarization quantities l(t) ≜ l and r(t) ≜ r, i.e., l*l+r*r=1, is enforced via the real angles τ(t) ≜ τ and ψ(t) ≜ ψ.

Thus, in Equation 2 there are four real quantities {Re(L), Im (L), Re (R), Im (R)} on the left and four real quantities {A, ϕ, τ, ψ} on the right, and the change of variables is invertible. The quantities L(t) and R(t) represent, at different instances of time, the left and right components of a polarized signal revived from a moving object. The left and right components correspond to the two polarization planes, such as the X-Z and Y-Z planes, if the signal is assumed to propagate along the Z axis. The utility of this parametric representation is that the quantities {A, ϕ}, that refer to range of the moving object from the receiver receiving the signal, and the quantities {τ, ψ}, that refer to polarization, are separated. A DRFM jammer produces apparent changes in the range and Doppler of the jamming aircraft to produce replica targets, by effectively performing a linear transformation on the exponent iϕ. In a typical jammer, these transformations typically do not produce any changes in the polarization of the signal. Thus, in a signal transmitted by a typical jammer, the quantities {A, ϕ} are manipulated to make difficult the determination of the location and/or tracking of the moving object having the jammer, but the quantities {τ, ψ} are not generally manipulated.

Variations in the parameters τ and ψ with timescales on the order of a fraction of a second (e.g., a few hundreds of microseconds, a few milliseconds, tens of milliseconds, hundreds of milliseconds, etc.) and up to a few seconds are inevitable and, to some degree uncontrollable, since they reflect the orientation of the jammer pod more or less rigidly attached to the moving object. These modulations include those induced by roll, pitch, and/or yaw motion of the moving due to natural effects like wind-buffeting, vibrational motion of the pod, and due to intentional maneuvers of the moving object. Any intentional modulation of the polarization of a signal transmitted by the jammer and/or a transmitter associated with the moving object can appear as a time variation in the parameters τ and ψ. The unintentional, uncontrollable modulations, however, generally further modulate the intentional modulations.

Figure 4B:
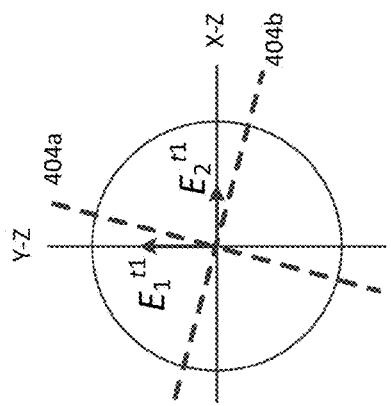
FIGS. 4A-4D show modulation of polarization of a received signal, according to some embodiments.
Figure 4D:
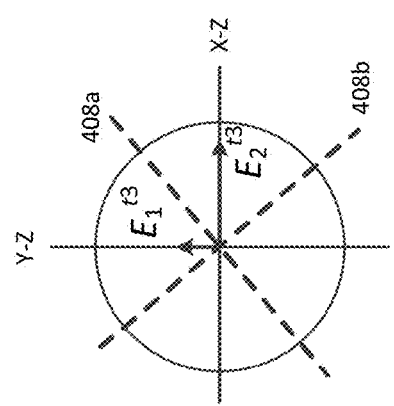
Figure 4A:
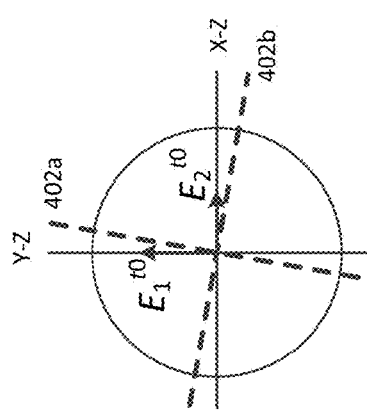
Figure 4C:
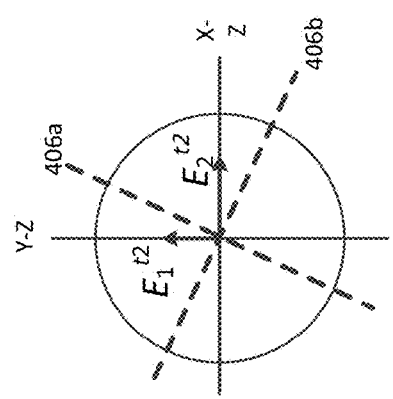

FIG. 4A depicts an initial polarization state of a signal received from a moving object at time t0. The signal is assumed to propagate along the Z axis and the electric field oscillates in one or both of the two polarization planes 402a, 402b that are perpendicular or at an angle to each other. If the received signal is linearly polarized, it would oscillate in only one plane. If the signal is circularly or elliptically polarized, it would oscillate in both planes. In the case of circular polarization, the two polarization planes are perpendicular to each other. In the case of elliptical polarization, the two polarization planes can be at an angle other than 90°. It should be understood that this example is illustrative only and that the signal can be assumed to propagate along the X or Y axes. The two polarization planes would be normal to the axis of propagation and to each other.

As shown in FIGS. 4A-4D, at time t0 the polarization planes 402a, 402b are not perfectly aligned with the X-Z and Y-Z planes. Due to the motion of the moving object, at time t1, the polarization planes 404a, 404b have changed their orientations relative to the X-Z and Y-Z planes. At times t2 and t3, respectively, the orientations of the polarization planes 406a, 406b and 408a, 408b have changed again relative to the X-Z and Y-Z planes, due to the motion of the moving object. In the case of elliptical polarization, the angle between the two planes can also change at different times. These changes in the orientations may be caused by the unintentional, uncontrollable motion of the moving object and/or due to intentional maneuvering thereof. In some cases, a portion of the change in the orientation of the polarization plane can be attributed to intentional modulation of the polarization and another portion of the change can be attributed to the movement of the object. Due to these changes, the values of $\tau(t)$ and/or $\psi(t)$ can change as t changes from t0 to t1 to t2 to t3, and so on.

In general, a dual-polarized radar receiver can sense the two complex envelope functions L and R of a signal received from a moving object at the two polarization planes of the dual-polarized receiver. For example, these complex functions are represented as $E_1^{t_k}$ and $E_2^{t_k}$, respectively, at the X-Z and Y-Z planes in FIGS. 4A-4D. The moving object can be an aircraft, a missile, or a drone. The received signal can be a jamming signal transmitted by the object, providing a fake object for detection, location determination, and/or tracking, or a signal transmitted by the object for locating and/or tracking other objects. As an example, a DRFM jammer employing in a single polarization usually creates replicas indicating fake targets by modifying the common phase factor $Ae^{i\Phi}$. This factor can be computed from the measurements according to:

$$A = \sqrt{R^*R + L^*L} \quad (3)$$

$$\phi = \frac{1}{2}\text{atan2}(\text{Im}(LR), \text{Re}(LR)) \quad (4)$$

Then, $$\begin{bmatrix} l \\ r \end{bmatrix} = \frac{e^{-i\phi}}{A}\begin{bmatrix} L \\ R \end{bmatrix} = \begin{bmatrix} e^{i\tau(t)}\cos\psi \\ e^{-i\tau(t)}\sin\psi \end{bmatrix} \quad (5)$$

The signals $l(t) \triangleq l$ and $r(t) \triangleq r$ depend only on the polarization of the received signal and not on the range and phase, and are therefore typically unmodified by the DRFM jamming mechanism. Even if a jamming mechanism intentionally modifies the polarization, l(t) and r(t) would further depend on the motion of the moving object. Since these two components generally contain the same information, we can use any one of the signals l(t) and r(t).

It should be noted that either of these functions represents an accidental modulation on the polarization of the received signal that is not under the control of the adversary. The modulation can represent the roll, pitch, and/or yaw motions of the moving object. If the received signal is linearly polarized, the modulation is typically on the quantity $\psi$. If the polarization of the received signal is circular, the modulation is on the quantity $\tau$. For an elliptically polarized received signal, there is a combined modulation of both $\tau$ and $\psi$. As described below, the computations involved in the determination of the location, orientation, range, and/or speed of the moving object depend on the signals l(t) and/or r(t) without requiring further decomposition of these signals into components thereof and determination of individual quantities such as $\tau$ and/or $\psi$, and/or the modulation thereof.

Figure 5:
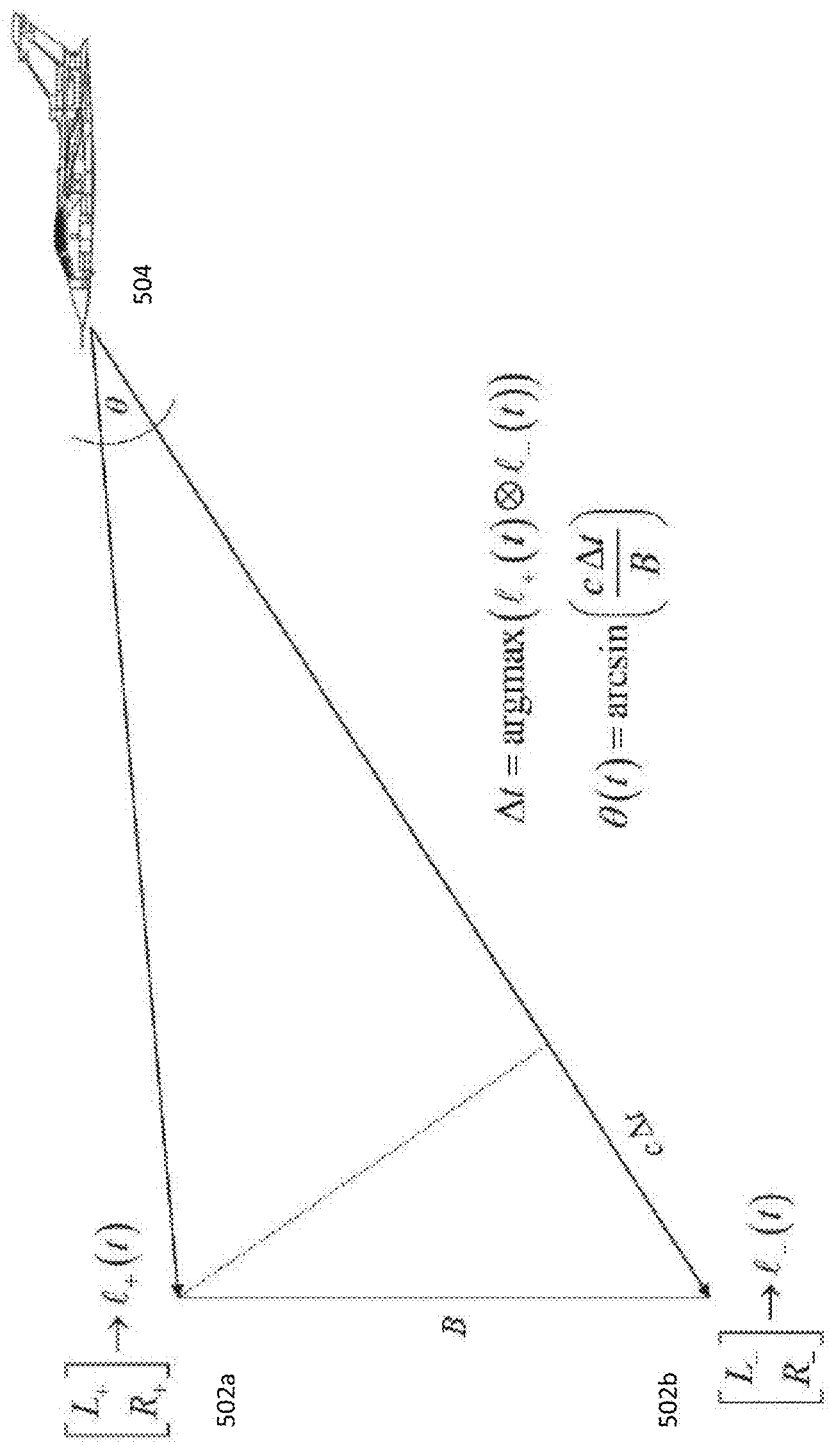
FIG. 5 schematically depicts a location determination/tracking system according to one embodiment.

We reference to FIG. 5, consider a pair 502a, 502b of dual-polarized radar receivers separated by a known, selected bistatic baseline B. Typically, the two receivers 502a, 502b is separated by a few feet, tens of feet, several meters, etc. Signals from these two receivers can be synchronized, for example, by connecting them to a common point in the middle with delay lines of equal length. Each of the receivers 502a, 502b can sense the two complex envelope functions of a signal received from a moving object 504. The complex envelope functions received at the receiver 502a are denoted $L_+$ and $R_+$ and the complex envelope functions received at the receiver 502b are denoted $L_-$ and $R_-$. Using these complex envelope functions, the function $l_+(t)$ corresponding to the dual-polarized receiver 502a and the function $l_-(t)$ corresponding to the dual-polarized receiver 502b can be calculated using Equation 5. In some embodiments, the functions $r_+(t)$ and $r_-(t)$ are computed using Equation 5.

Because the two receivers 502a, 502b are placed at different locations relative to the moving object 504, aside from noise, the two signals $l_+(t)$ and $l_-(t)$ are time-delayed replicas of the same signal representing modulation of the polarization of the signal received from the moving object 504, where the modulation is caused at least in part by the roll, pitch, and/or yaw motion of the object 504. The delay between the two signals can be calculated as:

$$\Delta t = \text{argmax}(l_+(t) \otimes l_-(t)) \quad (6)$$

where the operator $\otimes$ represents a correlation between $l_+(t)$ and $l_-(t)$. Such correlation is performed at different candidate delays between $l_+(t)$ and $l_-(t)$, and the value of the candidate delay that maximizes the correlation is designated as the delay between the two signals, denoted $\Delta t$. The geometrical angle $\theta$ associated with the moving object 504 is calculated as:

$$\theta = \arcsin\left(\frac{c\Delta t}{B}\right) \quad (7)$$

Various embodiments are not limited to a single bistatic baseline as shown in FIG. 5. For tracking in two angles, azimuth and elevation, two crossed dual-polarized receiver pairs can be used. Using the quantities B, $\Delta t$, and $\theta$, the location and/or orientation of the moving objet relative to either or both of the receivers 502a, 502b can be determined.

In this way, the location of a moving object can be determined and/or the object can be tracked passively, using the signal transmitted by the object itself, such as a DRFM jamming signal or a radar signal, which typically has high signal to noise ratio (SNR). Such location determination/tracking is generally independent of the jamming function that attempts to spoof tracking radars. The modulation that forms the basis for the tracking function used is induced by the rolling, yaw, and/or pitch motion of the aircraft, which is generally difficult for an adversary to control or minimize.

As discussed herein, separating polarization-based and non-polarization based components of a signal, and using the modulation of the polarization-based component to determine the location and/or orientation of a moving object and/or to track the object cannot be considered to be a mathematical or mental concept. These operations that take into consideration one or more received signals and their respective polarizations, as described above, are also not merely performing generic computer and/or database operations and are also not mere data organization or reorganization.

Unlike any generic operations such as data transmission and reception, unlike usual computer functions such as storage and access of information, and unlike any mathematical or mental processes such as comparing and categorizing information, the unconventional operations involved in separating signal components and using the modulation of one of the separated components for detection and/or tracking of a moving object, as described herein, are specifically orchestrated. These specific operations make the methods and systems for location determination and/or tracking limited and specialized techniques of increasing the effectiveness of detection/tracking systems while minimizing their cost.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A method for determining location of a moving object, the method comprising the steps of:

receiving from a first receiver antenna system, comprising a first left polarized receiver and a first right polarized receiver, a first signal transmitted by a moving object;

receiving simultaneously from a second receiver antenna system that is distinct and space apart from the first receiver antenna system and that comprises a second left polarized receiver and a second right polarized receiver, a second signal transmitted by the moving object;

extracting from the first signal a first polarization-based component;

extracting from the second signal a second polarization-based component;

computing a time difference maximizing a correlation of the first and second polarization-based components; and computing a location of the moving object based on, in part, the time difference.

2. The method of claim 1, wherein extracting from the first signal a first polarization-based component comprises:

determining a first amplitude and a first phase of an electric field associated with the first signal; and scaling the first signal according to the first amplitude and the first phase.

3. The method of claim 2, wherein extracting from the second signal a second polarization-based component comprises:

determining a second amplitude and a second phase of an electric field associated with the second signal; and scaling the second signal according to the second amplitude and the second phase.

4. The method of claim 1, wherein one of:

the first and second polarization-based components correspond to the first and second left polarized receivers; and the first and second polarization-based components correspond to the first and second right polarized receivers.

5. The method of claim 1, wherein a polarization is associated with the first signal, a type of the polarization being one of linear polarization, circular polarization, and elliptical polarization.

6. The method of claim 1, wherein:

the first signal is received from a first instance of time t1 at least up to a second instance of time t2; and a polarization associated with the first signal has a polarization value at the second instance of time t2 that is different from a polarization value at the first instance of time t1.

7. The method of claim 6, wherein the polarization value changes from the first instance of time t1 at least up to the second instance of time t2, the change corresponding at least in part to a motion of the moving object.

8. The method of claim 1, wherein the moving object is selected from the group consisting of an aircraft, a drone, and a missile.

9. The method of claim 1, wherein the first and second signals are transmitted by a jammer aboard the moving object.

10. A system for determining location of a moving object, the system comprising:

a first processor; and a first memory in electrical communication with the first processor, the first memory comprising instructions which, when executed by a processing unit comprising at least one of the first processor and a second processor, the processing unit being in electronic communication with a memory module comprising at least one of the first memory and a second memory, program the processing unit to:

receive from a first receiver antenna system, comprising a first left polarized receiver and a first right polarized receiver, a first signal transmitted by a moving object;

receive simultaneously from a second receiver antenna system that is distinct and spaced apart from the first receiver antenna system and that comprises a second left polarized receiver and a second right polarized receiver, a second signal transmitted by the moving object;

extract from the first signal a first polarization-based component;

extract from the second signal a second polarization-based component;

compute a time difference maximizing a correlation of the first and second polarization-based components; and compute a location of the moving object based on, in part, the time difference.

11. The system of claim 10, wherein to extract from the first signal a first polarization-based component the processing unit is programmed to:

determine a first amplitude and a first phase of an electric field associated with the first signal; and scale the first signal according to the first amplitude and the first phase.

12. The system of claim 11, wherein to extract from the second signal a second polarization-based component the processing unit is programmed to:

determine a second amplitude and a second phase of an electric field associated with the second signal; and scale the second signal according to the second amplitude and the second phase.

13. The system of claim 10, wherein one of:

the first and second polarization-based components correspond to the first and second left polarized receivers; and the first and second polarization-based components correspond to the first and second right polarized receivers.

14. The system of claim 10, wherein a polarization is associated with the first and second signals, a type of the polarization being one of linear polarization, circular polarization, and elliptical polarization.

15. The system of claim 10, wherein:

the first signal is received from a first instance of time t1 at least up to a second instance of time t2; and a polarization associated with the first signal has a polarization value at the second instance of time t2 that is different from a polarization value at the first instance of time t1.

16. The system of claim 15, wherein the polarization value changes from the first instance of time t1 at least up to the second instance of time t2, the change corresponding at least in part to a motion of the moving object.

17. The system of claim 10, wherein the moving object is selected from the group consisting of an aircraft, a drone, and a missile.

18. The system of claim 10, wherein the first and second signals are transmitted by one of a jammer and a transmitted aboard the moving object.

19. The system of claim 10, further comprising at least one of the first receiver antenna system and the second receiver antenna system.

* * * * *